United States Patent
Suzuki et al.

[11] Patent Number: 5,616,198
[45] Date of Patent: Apr. 1, 1997

[54] PNEUMATIC TIRE WITH CARCASS PLY INCREASED IN THICKNESS PARTIALLY IN AT LEAST THE TIRE SHOULDER PORTIONS

[75] Inventors: Kazuya Suzuki; Ryo Ono, both of Shirakawa, Japan

[73] Assignee: Sumitomo Rubber Industries, Ltd., Hyogo-ken, Japan

[21] Appl. No.: 379,789

[22] Filed: Jan. 27, 1995

[30] Foreign Application Priority Data

Feb. 9, 1994 [JP] Japan .................................... 6-037872

[51] Int. Cl.⁶ ............................. B29D 30/38; B60C 9/04; B60C 9/08
[52] U.S. Cl. ........................ 152/556; 152/548; 152/557; 152/560; 156/123; 156/133
[58] Field of Search .......................... 152/548, 556–557, 152/560; 156/110.1, 123, 133

[56] References Cited

U.S. PATENT DOCUMENTS

| 3,500,888 | 3/1970 | Boileau | 152/557 X |
| 3,783,926 | 1/1974 | de Zarauz | 152/557 X |

FOREIGN PATENT DOCUMENTS

| 0555071 | 8/1993 | European Pat. Off. | 152/548 |
| 2854611 | 7/1979 | Germany . | |
| 1159093 | 7/1969 | United Kingdom . | |

*Primary Examiner*—Adrienne C. Johnstone
*Attorney, Agent, or Firm*—Birch, Stewart, Kolasch & Birch, LLP

[57] ABSTRACT

A pneumatic tire comprises a toroidal carcass ply composed of cords arranged radially at the same angle to the tire equator and extending continuously between the bead portions through the tread portion and sidewall portion, and the carcass ply is increased in thickness partially in at least a tire shoulder portion. A method of making the tire comprises a step of heating a raw tire, wherein a raw carcass ply is composed of cords having at least two different heat-shrinkage-percentages.

8 Claims, 6 Drawing Sheets

5,616,198

PNEUMATIC TIRE WITH CARCASS PLY INCREASED IN THICKNESS PARTIALLY IN AT LEAST THE TIRE SHOULDER PORTIONS

BACKGROUND OF THE INVENTION

The present invention relates to a pneumatic tire having an improved carcass structure capable of improving steering performance without increasing the tire weight, and also relates to a method of making the same.

In general, a pneumatic tire is provided with at least one carcass ply. Further, in order to reinforce the tread portion, a belt composed of cords arranged at different angles from the carcass cord angle is disposed. Furthermore, to reinforce the bead portion and sidewall lower portion, a hard rubber bead apex and a bead reinforcing cord layer having a different cord angle from the carcass cord angle is disposed. Therefore, due to the different cord angles, an additional carcass ply can not be substituted for such a belt and bead reinforcing layer.

On the other hand, recent high performance motorcars require a high performance tire in which steering performance is improved but the tire weight is not increased.

If an additional carcass ply is disposed, the lateral stiffness of the tire is increased and the steering performance can be improved. However, such an additional carcass ply is redundant in the tread portion and bead portion and only increases the tire weight. If the additional carcass ply is not disposed, the tire shoulder portion or sidewall upper portion becomes relatively weak. Therefore, if a reinforcing cord layer is disposed partially in the shoulder portion, the edges of the layer are liable to separate since the bending deformation of the shoulder portion is greatest.

SUMMARY OF THE INVENTION

An object of the present invention is therefore, to provide a pneumatic tire in which the steering performance is improved without increasing the tire weight.

Another object of the present invention is to provide a method of making such a tire.

According to one aspect of the present invention, a pneumatic tire comprises a tread portion, a pair of axially spaced bead portions with a bead core disposed therein, a pair of sidewall portions extending therebetween, a toroidal carcass ply composed of cords arranged radially at the same angle to the tire equator and extending continuously between the bead portions through the tread portion and sidewall portion, and a belt disposed radially outside the carcass in the tread portion, wherein the carcass ply is increased in thickness partially in the tire shoulder portion.

Further, according to one aspect of the present invention, a method of making a pneumatic tire comprising assembling a raw carcass ply and other materials into a raw tire, placing the raw tire in a mold and heating the raw tire in the mold for vulcanization, wherein the raw carcass ply is composed of cords having at least two different heat-shrinkage-percentages, and the cords having a lower heat-shrinkage-percentage and the cords having a higher heat-shrinkage-percentage are arranged alternately in the tire circumferential direction.

BRIEF DESCRIPTION OF THE DRAWINGS

Embodiments of the present invention will now be described in detail in conjunction with the accompanying drawings.

FIG. 4($b$) is a sectional view of another example of the carcass ply formed with the raw rubberized cord sheet shown in FIG. 4($a$).

FIG. 5($b$) is a sectional view of still another example of the carcass ply formed with the raw rubberized cord sheet shown in FIG. 5($a$).

FIG. 8($b$) is a diagram showing the crystal structure of a high modulus polyester.

DESCRIPTION OF THE PREFERRED EMBODIMENTS

Figure 1:
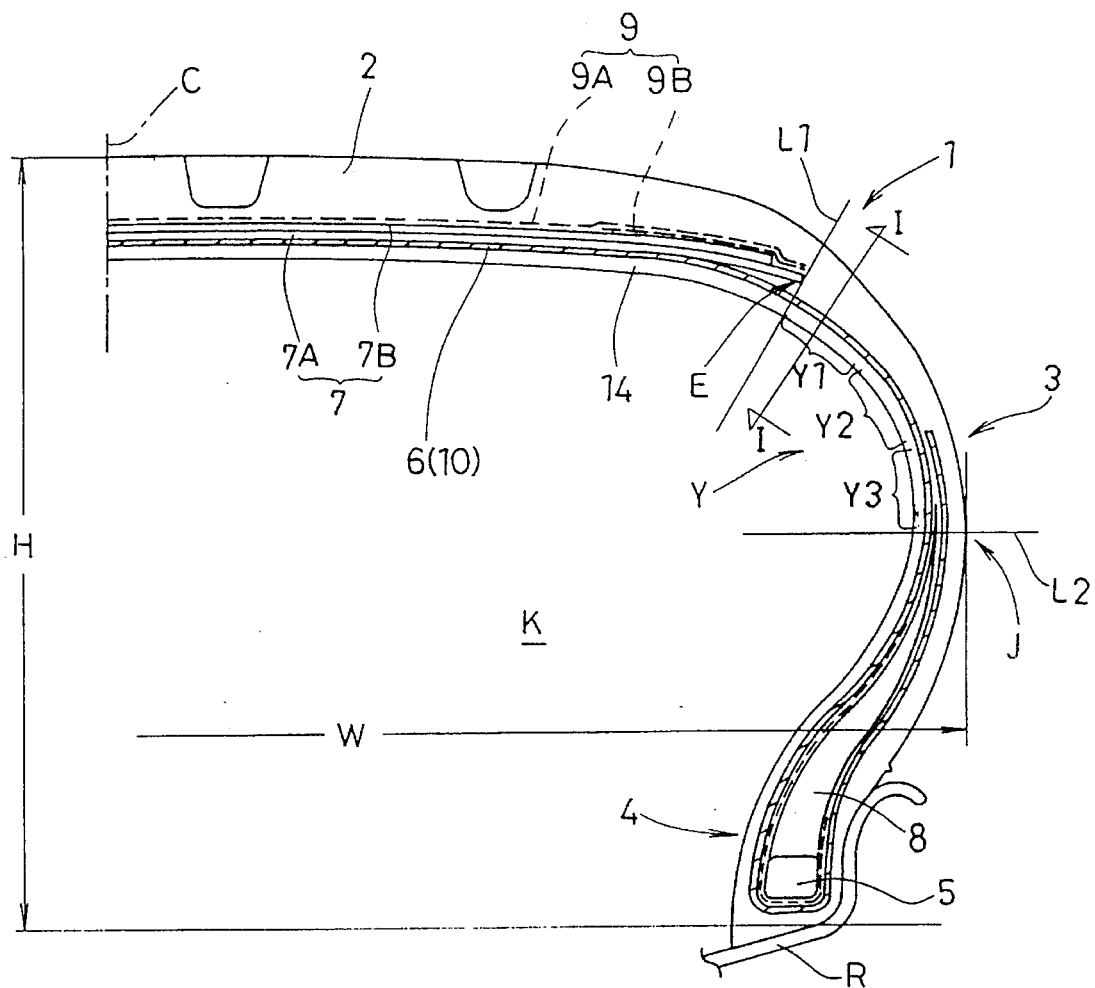
FIG. 1 is a cross sectional view of a tire according to the present invention.

In FIG. 1, the pneumatic tire 1 of the invention is a passenger radial tire having a relatively low aspect ratio of not more than 0.60 (for example 0.5). The aspect ratio is the ratio H/W of the tire section height H to the tire section width W under a normal inflated state in which the tire is mounted on its standard rim R and inflated to its normal pressure. FIG. 1 shows the tire 1 under such state.

The tire 1 comprises a tread portion 2, a pair of axially spaced bead portions 4, a pair of sidewall portions 3 extending therebetween, a bead core 5 disposed in each of the bead portion 4, a toroidal carcass 6 extended between the bead portions 4 through the sidewall portion 3 and the tread portion 2, and a belt 7, 9 disposed radially outside the carcass 6 and inside the tread portion 2.

The carcass 6 comprises at least one ply, in this embodiment only one ply 10, of radially arranged cords extending between the bead portions 4 through the tread portion 2 and sidewall portions 3 and turned up around the bead cores 5 from the axially inside to outside of the tire to be secured thereto and to form a pair of carcass ply turnup portions and a main portion therebetween.

The carcass cords 11 in each carcass ply are arranged at a certain angle in the range of from 70 to 90 degrees with respect to the tire equator C. In the single carcass ply 10 in this example, the cords 11 are arranged at 90 degrees with respect to the tire equator C.

For the carcass cords, organic fiber cords, e.g. polyester, nylon, rayon and the like are used.

Between the carcass ply turnup portion and main portion in each bead portions 4, a bead apex 8 is disposed. The bead apex 8 is made of a hard rubber compound preferably having a JIS-A hardness of 80 to 95 degrees and a complex elastic modulus E* of 300 to 600 kg/cm$^2$. The bead apex 8 extends taperingly radially outwards from the bead core 5 to a position near the maximum tire sectional width point (J) so as to reinforce the bead portion 4 and the sidewall lower portion.

The belt in this embodiment comprises a breaker belt 7 disposed on the carcass crown and a band belt 9 disposed radially outside of the breaker belt 7.

The breaker belt 7 comprises two cross plies 7A and 7B of high modulus cords, e.g. steel cords, aromatic polyamide fiber cords and the like, laid at an angle of not more than 35 degrees with respect to the tire equator C. The cords in each ply are laid parallel with each other, but crosswise to the cords in the next ply.

The band belt 9 is for covering at least axial edge portions (E) radially outside of the breaker belt 7 so as to prevent the breaker belt 7 from being lifted by the centrifugal force during high speed running. In this example, the band belt 9 comprises a pair of axially spaced narrow width inner plies 9B each disposed on each of the edges E of the breaker belt 7 to cover the edge portions, and a wide outer ply 9A disposed thereon to cover the whole width of the outer surface of the breaker belt 7. Each ply 9A, 9B is made of for example nylon cords having a diameter smaller than that of the breaker belt cords, and the cord angle is in the range of from 0 to 10 degrees with respect to the tire equator C. Preferably, the angle is about zero.

According to the present invention, at least one carcass ply, in this example the single carcass ply 10, is increased in the thickness partially in at least a tire shoulder portion Y1.

Figure 2:
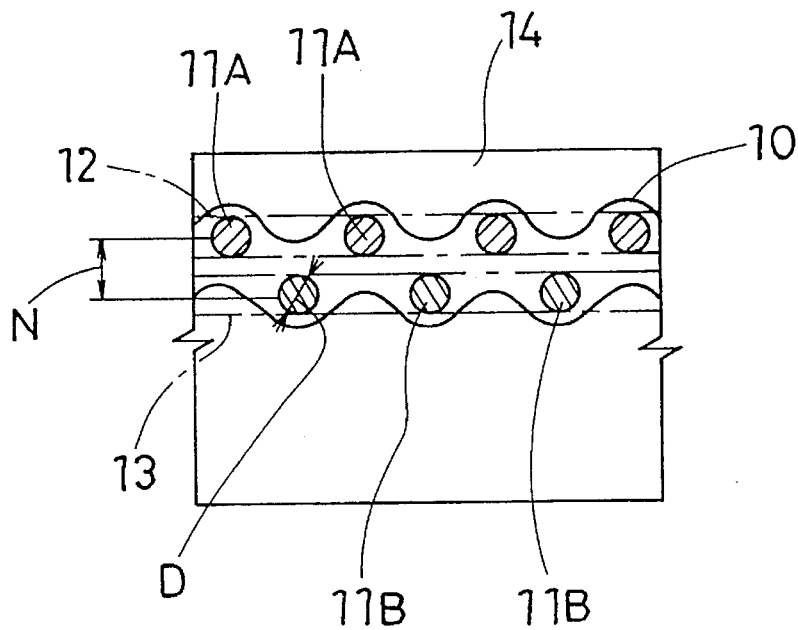
FIG. 2 is a sectional view of an example of the carcass ply taken along the line I—I of FIG. 1.
Figure 4A:
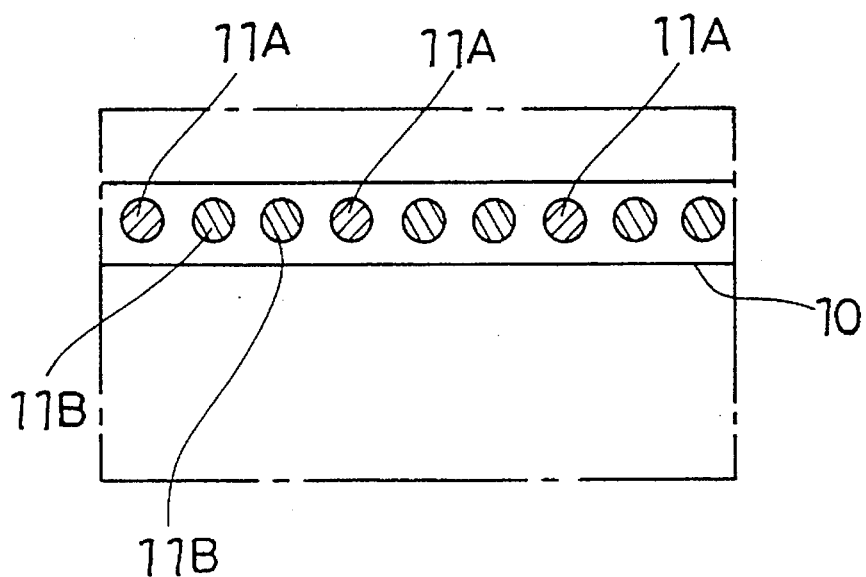
FIG. 4($a$) is a sectional view of another example of the raw rubberized cord sheet.
Figure 4B:
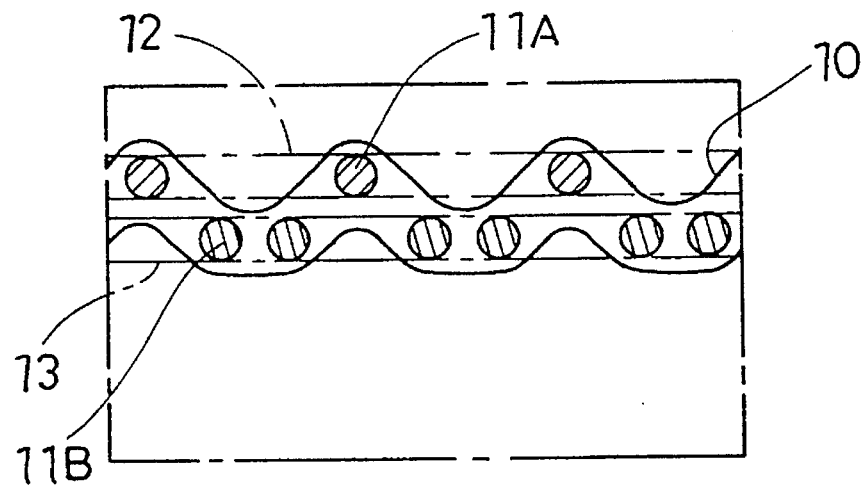
Figure 5A:
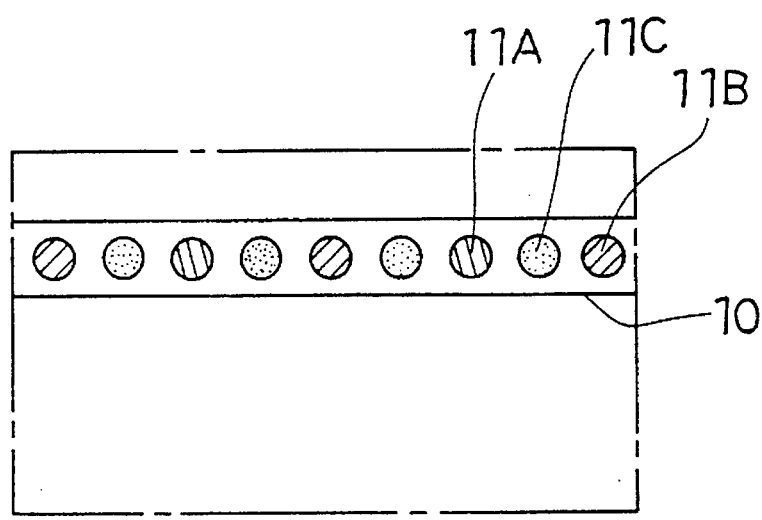
FIG. 5($a$) is a sectional view of still another example of the raw rubberized cord sheet.
Figure 5B:
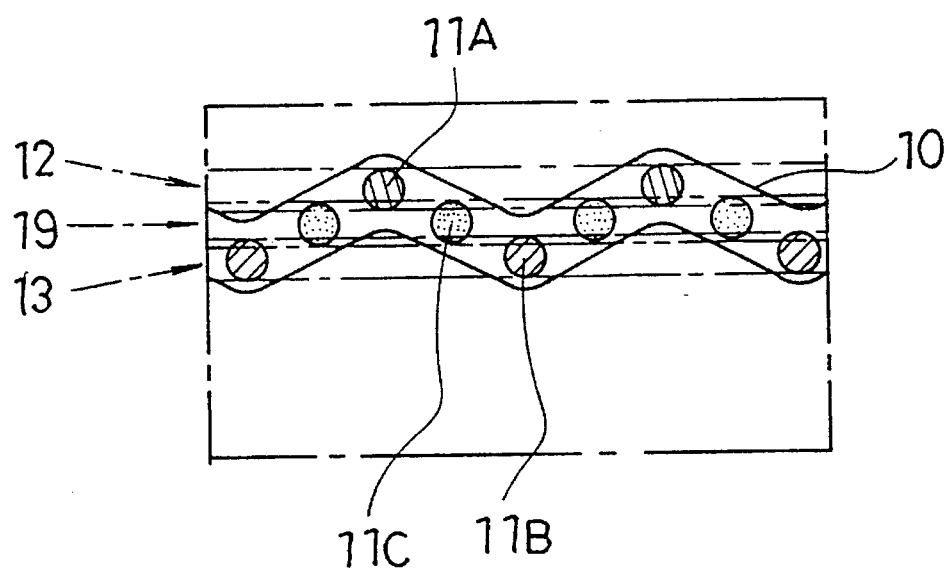

Here, the "increase" in the ply thickness does not mean that of the topping rubber nor the cord diameter. As shown in FIGS. 2, 4(b) and 5(b), the "increase" means that some predetermined cords 11B in a ply are located outside of the tire, and some other predetermined cords 11A are located inside of the tire, and as a result the distance from the outer cords 11B to the inner cords 11A is increased.

In FIG. 1 showing the tire under the normal inflated state,

L1 is a first straight line drawn at a right angle to the carcass 6 from the edge E of the breaker belt 7, L2 is a second straight line drawn at a right angle to the carcass 6 from the maximum tire sectional width point J on the sidewall portion 3, Y is a region of the carcass ply between the lines L1 and L2, Y1, Y2 and Y3 are one third part of the region Y, and the radially outer, middle and inner parts, respectively.

In general, the bending deformation of the carcass during running is greater in the above-mention region Y than the remaining region. Especially, in the radially outer part Y1, the deformation is greatest. Therefore it is most effective for improving steering performance to increase the bending rigidity in the radially outer part Y1 by increasing the carcass ply thickness partially in this part.

The distance N between the centers of the inner cords 11A and the outer cords 11B in the radially outer part Y1 is in the range of from 0.3 to 1.5 times, preferably 0.3 to 0.7 times the diameter D of the carcass cords 11A and 11B.

If the distance N is less than 0.3 times the cord diameter D, the above-mentioned bending rigidity is not increased. If the distance N is more than 1.5 times the cord diameter D, the inner carcass cords 11A sometimes break the airtight inner liner 14, and further a separation failure between the carcass ply and the inner liner is liable to occur. The reason will be explained later.

Figure 3:
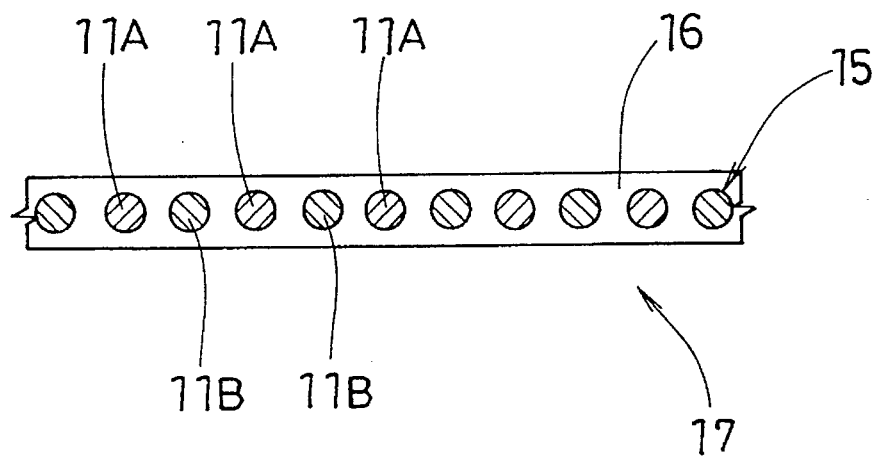
FIG. 3 is a sectional view of an example of the raw rubberized cord sheet for used to make the carcass ply shown in FIG. 2.

The thickness of the carcass ply is thus defined as D+N. Therefore, if N is zero as shown in FIGS. 3, 4 and 5(a), the ply thickness is D, the cord diameter.

The thickness of the carcass ply turnup portion and the carcass ply main portion in the bead portion is not increased, that is, it is equal to the cord diameter D.

Further, the thickness of the carcass ply is preferably increased towards the radially outer part Y1 from the bead portion 4. With respect to the thickness, it is preferable that the outer part Y1>the middle part Y2>the inner part Y3.

Furthermore, the thickness of the carcass ply is preferably increased towards the radially outer part Y1 from the tire equator C.

The above-explained thickness increase can be achieved by using carcass cords having different heat-shrinkage-percentages in the vulcanizing process of the tire.

Here, the vulcanizing process is such that a raw tire that is the assembly of the carcass, belt, bead core, bead apex, tread rubber, sidewall rubber, inner liner, etc., is placed in a mold, and a bladder that is an air bag or tube is inserted in the tire, and then the tire is heated while pressurizing the inside of the tire by increasing the inner pressure of the bladder.

That is, a conventional vulcanizing process is used in this invention.

The carcass cords are arranged in line or in a plane and rubberized with topping rubber 16 in the form of a rubber sheet 17 as usual. However, the carcass cords 11A, 11B, 11C having different heat-shrinkage-percentages K are arranged in a specific sequence as shown in FIGS. 3, 4(a), 5(a).

In order to achieve the above-explained distance N, the difference between the minimum heat-shrinkage-percentage K2 and the maximum heat-shrinkage-percentage K1 is set in the range of not more than 5.0%, and the minimum heat-shrinkage-percentage K2 is set in the range of not more than 5.0%, preferably 4.5 to 3.5%.

The heat-shrinkage-percentage K is the percentage (y/x)× 100 of the amount (y) of the shrinkage of the cord after the cord is placed in a 180 degrees C. atmosphere for 20 minutes with no load to the length (x) of the cord before the shrinkage.

Therefore, because of the heat in the vulcanizing process, the cords 11A having a greater heat-shrinkage-percentage K1 shrink more than the cords 11B having a smaller heat-shrinkage-percentage K2. As a result, the cords 11A move towards the inside of the tire by a greater amount than the cords 11B to increase the ply thickness.

If the minimum heat-shrinkage-percentage K2 is more than 5.0%, the dimensional stability in the finished tire is decreased, and the tire uniformity is liable to be disturbed. If the difference K1−K2 is more than 5.0%, the distance N is excessively increased, and the inner cords decrease the topping rubber thickness so as to cause cord separation failure, or sometimes break the inner liner to deteriorate the airtightness.

In a tire having a relatively low aspect ratio such as the tire 1 shown in FIG. 1, the inward movement of the carcass cords by the shrinkage is liable to become greater toward the shoulder portion Y1 from the bead portion 4 and the tire equator.

In FIG. 3, the cords 11A having a greater heat-shrinkage-percentage K1 and the cords 11B having a smaller heat-shrinkage-percentage K2 are alternately arranged. Accordingly, as shown in FIG. 2, in the carcass ply 10 in the finished tire, the cords 11A are located inside and the cords 11B are located outside of the tire. This part therefore, functions as a two-ply structure (inner ply 12+outer ply 13). In this case, the cord count of the inner ply 12 is the same as the outer ply 13.

FIG. 4 (a, b) shows another example of the carcass 10. In this example, one cord 11A having the greater heat-shrinkage-percentage K1 and pairs of cords 11B having the smaller heat-shrinkage-percentage K2 are arranged alternately in a raw state as shown in FIG. 4(a). Therefore, in the finished tire, as shown in FIG. 4(b), a two-ply structure in which the cord count of the outer ply 13 is twice the inner ply 12 is formed.

FIG. 5 (a, b) shows still another example of the carcass 10. In this example, three different heat-shrinkage-percentages are used. As shown in FIG. 5(a), in a raw state, the cords 11A having the maximum percentage K1, the cords 11B having the minimum percentage K2 and cords 11C having a medium percentage K5 are arranged as follows:

K1-K3-K2-K3-K1-K3-K2-K3- ---

Between the "K3", "K1" and "K2" appear alternately. Therefore, in the finished tire, as shown in FIG. 5(b), a three-ply structure (outer ply 13, inner ply 12, middle ply 19) is formed.

Figure 6:
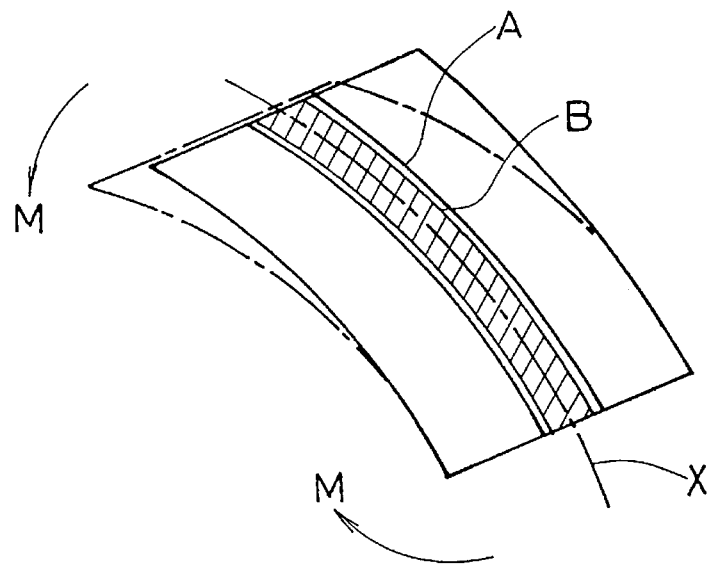
FIGS. 6 and 7 are diagrams for explaining the function of the present invention.

If the carcass ply thickness is not increased as shown in FIG. 6, the bending neutral line (X) when the carcass ply (A) is bent by a bending moment (M), substantially coincides with the thickness center line of the carcass ply (A), and only the bending rigidity of the cords (B) themselves serves as the bending rigidity of the carcass ply. Accordingly, the bending rigidity is very low.

Figure 7:
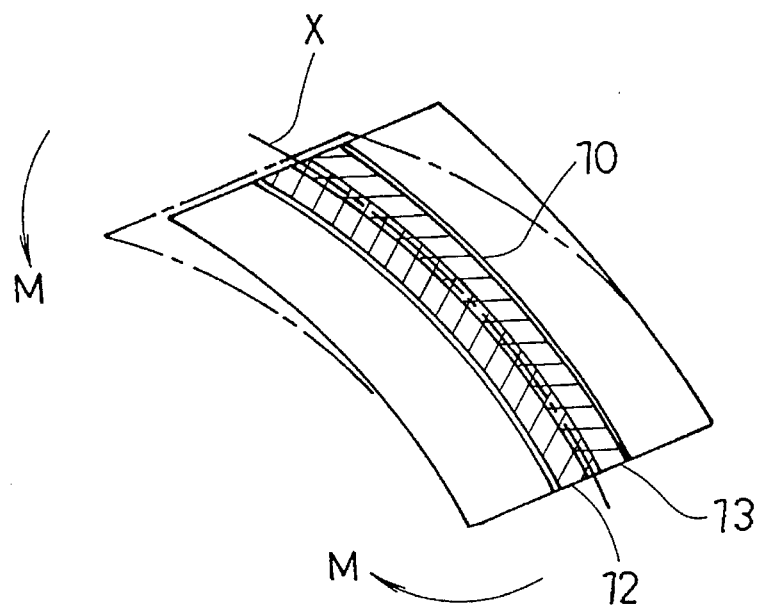

However, if the carcass ply thickness is increased as explained above and as shown in FIG. 7, the tensile and compressive elastic moduli of the carcass cords serves as the bending rigidity of the carcass ply in addition to the bending rigidity of the cords themselves. As a result, the bending rigidity is effectively increased. As the bending rigidity is increased in the outer part Y1, the steering performance is effectively improved.

The different heat-shrinkage-percentages are preferably achieved by using cords which are materially the same but different with respect to the cord treatment. For example, before assembled in a raw tire, the lower-percentage cord is heat shrunken, but the higher-percentage cord is not heat shrunken. Or, both the cords are heat shrunken, but stopped at different shrinkages by differing the heating time and/or temperature.

Figure 8A:
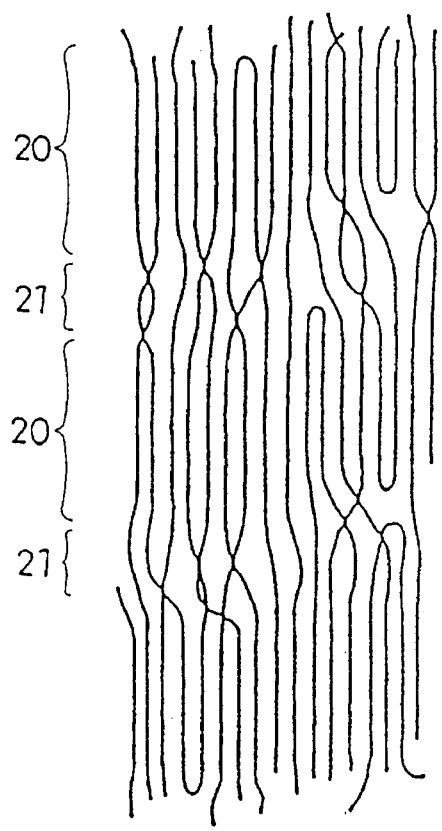
FIG. 8($a$) is a diagram showing the crystal structure of a regular modulus polyester.
Figure 8B:
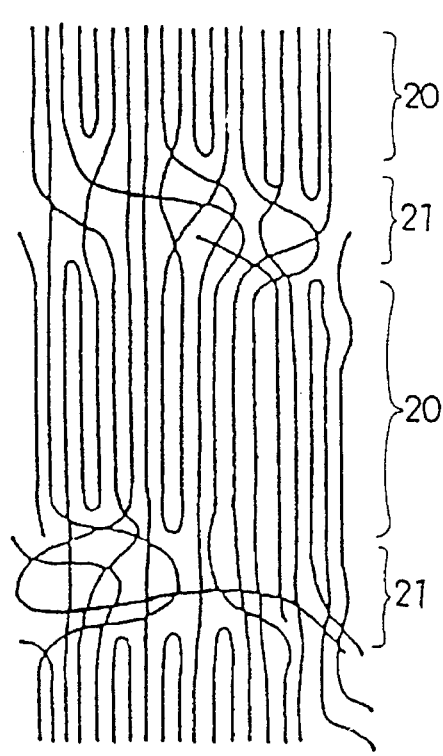

Further, the heat-shrinkage-percentages can be varied by using cords which are materially the same but different with respect to crystal structure. FIG. 8(a) is a diagram showing the crystal structure of a so called regular modulus polyester of which the heat-shrinkage-percentage is higher. FIG. 8(b) is a diagram showing the crystal structure of a high modulus polyester of which the heat-shrinkage-percentage is lower. In FIG. 8(a, b), 20 is the crystal region, and 21 is the amorphous region. Between the regular modulus polyester and high modulus polyester, the size, percentage, and orientation of such regions differ.

Furthermore, the heat-shrinkage-percentages may be varied by using materially different cords. For example, a nylon fiber cord is used for the high heat-shrinkage-percentage cord, and a polyester fiber cord is used for the low heat-shrinkage-percentage cord.

In the present invention, the carcass 6 can include a ply composed of cords having the same heat-shrinkage-percentage in addition to carcass ply 11 composed of the different cords (11A, 11B, 11C). Such an additional carcass ply is preferably disposed outside of the carcass ply 11.

Test tires having a size 225/50R16 and the structure shown in FIG. 1 were made and tested.

In the tests, the tires mounted on a standard rim of 16X7J and inflated to a normal inner pressure of 2.2 kg/cm² were provided in a 3000 cc FR passenger car. The test car was run in a test circuit course with a tire load of 360 kg, and the test driver evaluated the cornering performance, braking performance, straight running performance, response, and controlability in dry conditions, as the steering performances thereof.

The test results together with the tire specifications are shown in Table 1. The greater the value, the better the performance.

The present invention may be applied to all kinds of pneumatic tires, but is preferably applied to passenger car tires.

TABLE 1

| Tire | Ex. 1 | Ex. 2 | Ref. 1 | Ref. 2 |
| --- | --- | --- | --- | --- |
| Carcass | | | | |
| Number of ply | 1 | 1 | 1 | 2 |
| Cord | polyester 1500d/2 | polyester 150d/2 | polyester 1500d/2 | polyester 1500d/2 |
| Shrinkage-% K1 | 7.5 | 6.5 | 7.5 | 7.5 |
| Shrinkage-% K2 | 4.5 | 3.5 | 7.5 | 7.5 |
| Cord angle (deg) | 90 | 90 | 90 | 90 |
| Cord count/10 cm | 53 | 53 | 53 | 53 |
| Distance N | 0.5D | 0.3D | 0 | 0 |
| Test result | | | | |
| Cornering | 115 | 108 | 100 | 118 |
| Braking | 105 | 102 | 100 | 107 |
| Straight run | 105 | 103 | 100 | 105 |
| Response | 110 | 106 | 100 | 110 |
| Controlability | 115 | 108 | 100 | 110 |
| Circuit time | 2'7"05 | 2'8"91 | 2'8"76 | 2'7"01 |
| Tire weight (kg) | 10.6 | 10.6 | 10.5 | 11.3 |

We claim:

1. A pneumatic tire comprising a tread portion, a pair of axially spaced bead portions each with a bead core disposed therein, a pair of sidewall portions extending therebetween, a pair of tire shoulder portions, a toroidal carcass ply composed of cords arranged radially at the same angle to the tire equator and extending continuously between the bead portions through the tread portion and sidewall portions, and a belt disposed radially outside the carcass in the tread portion, said carcass ply having a thickness being increased partially in at least the shoulder portions, radially outward from the bead portions to the shoulder portions, and axially outward from the tire equator to the shoulder portions, in said increased thickness carcass ply portions, said cords in the carcass ply including inner cords and outer cords each having a diameter, the inner cords being placed inside of the outer cords so that the distance between the centers of the inner cords and the centers of the outer cords is in the range of from 0.3 to 1.5 times the diameter, whereby the carcass ply thickness is increased.

2. The pneumatic tire according to claim 1, wherein said distance is in the range of from 0.3 to 0.7 times the diameter.

3. The pneumatic tire according to claim 1, wherein said carcass ply cords are of the same organic material but having at least two different heat-shrinkage-percentages, and wherein the heat-shrinkage-percentage of said inner cords is higher than that of said outer cords.

4. The pneumatic tire according to claim 3, wherein the carcass ply in an unvulcanized state of the tire is made of a sheet formed by arranging the cords having different heat-shrinkage-percentages in a plane in a regular sequence and rubberizing the cords with topping rubber, and the difference between the maximum and the minimum of the heat-shrinkage-percentages is not more than 5.0%, and the minimum of the heat-shrinkage-percentages is not more than 5.0%, the heat-shrinkage-percentages being measured after placement in a 180° C. atmosphere for 20 minutes with no load.

5. The pneumatic tire according to claim 4, wherein the minimum heat-shrinkage-percentage is 3.5 to 4.5%.

6. The pneumatic tire according to claim 4, wherein said different heat-shrinkage-percentages are provided through different pre-heat-shrinking processes for the cords.

7. The pneumatic tire according to claim 4, wherein said different heat-shrinkage-percentages are provided by different crystal structures of the material of the cords.

8. The pneumatic tire according to claim 7, wherein said outer carcass ply cords are high-modulus polyester cords having a lower heat-shrinkage-percentage and said inner carcass ply cords are regular modulus polyester cords having a higher heat-shrinkage-percentage.

* * * * *